Figure 1:
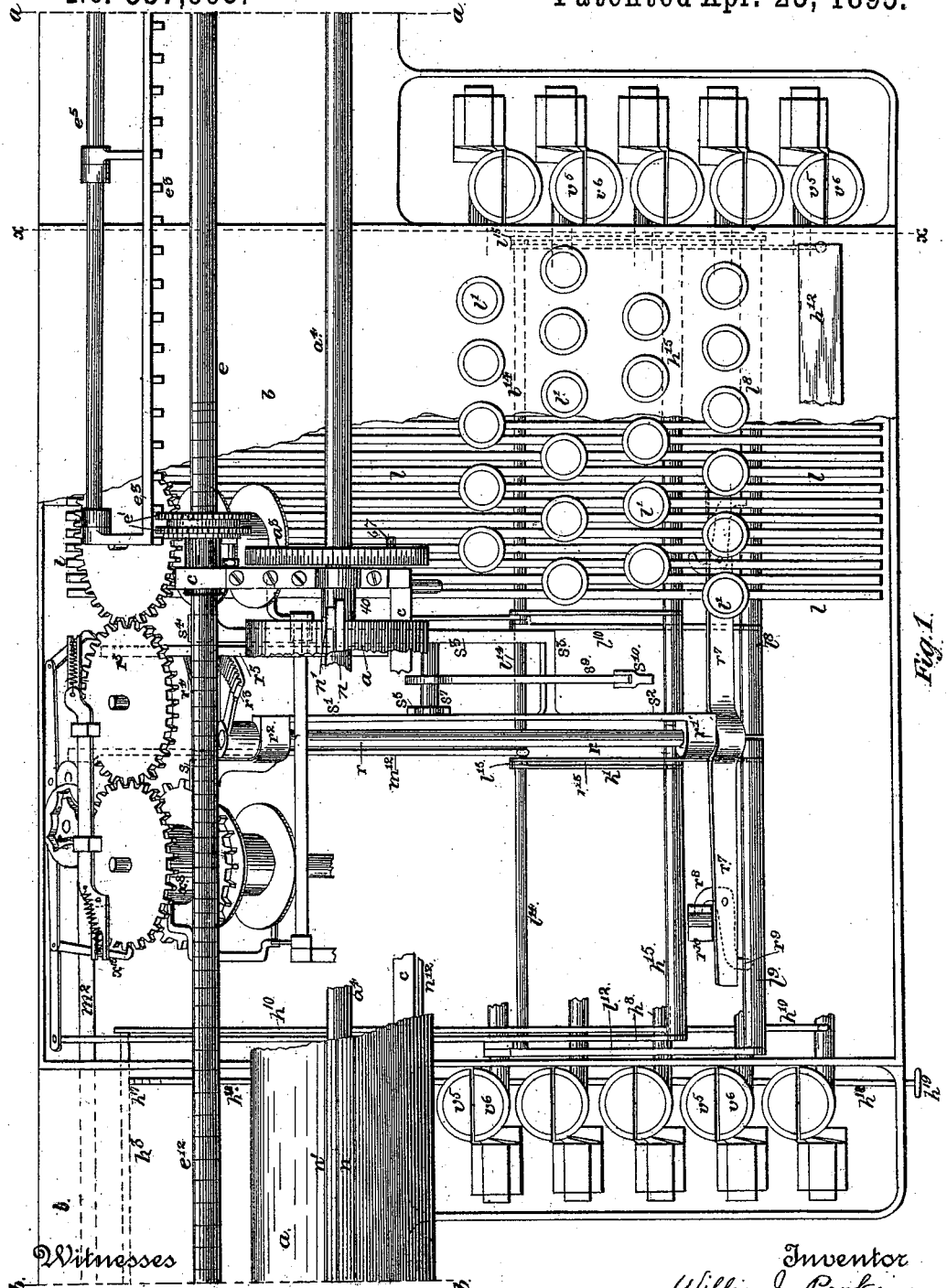

(No Model.)

W. J. PERKINS.
TYPE WRITING MACHINE.

No. 537,993. Patented Apr. 23, 1895.

Witnesses
C. B. Brock
C. W. H. Brown

Inventor
Willis J. Perkins
By his Attorney
W. H. Bartlett (No Model.) 11 Sheets—Sheet 2.
W. J. PERKINS.
TYPE WRITING MACHINE.

No. 537,993. Patented Apr. 23, 1895.

Witnesses
F. B. Brock
C. W. H. Brown

Inventor
Willis J. Perkins
By his Attorney
W. H. Bartlett (No Model.) 11 Sheets—Sheet 3.

W. J. PERKINS.
TYPE WRITING MACHINE.

No. 537,993. Patented Apr. 23, 1895.

Witnesses
F. B. Brock
C. W. H. Brown

Inventor
Willis J. Perkins
By his Attorney
W. H. Bartlett (No Model.) 11 Sheets—Sheet 4.

W. J. PERKINS.
TYPE WRITING MACHINE.

No. 537,993. Patented Apr. 23, 1895.

Witnesses
F. B. Brock
C. M. H. Brown

Inventor
Willis J. Perkins
By his Attorney
W. A. Bartlett (No Model.)  W. J. PERKINS.  11 Sheets—Sheet 5.
TYPE WRITING MACHINE.
No. 537,993.  Patented Apr. 23, 1895.
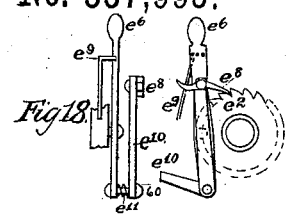
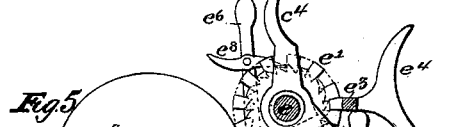
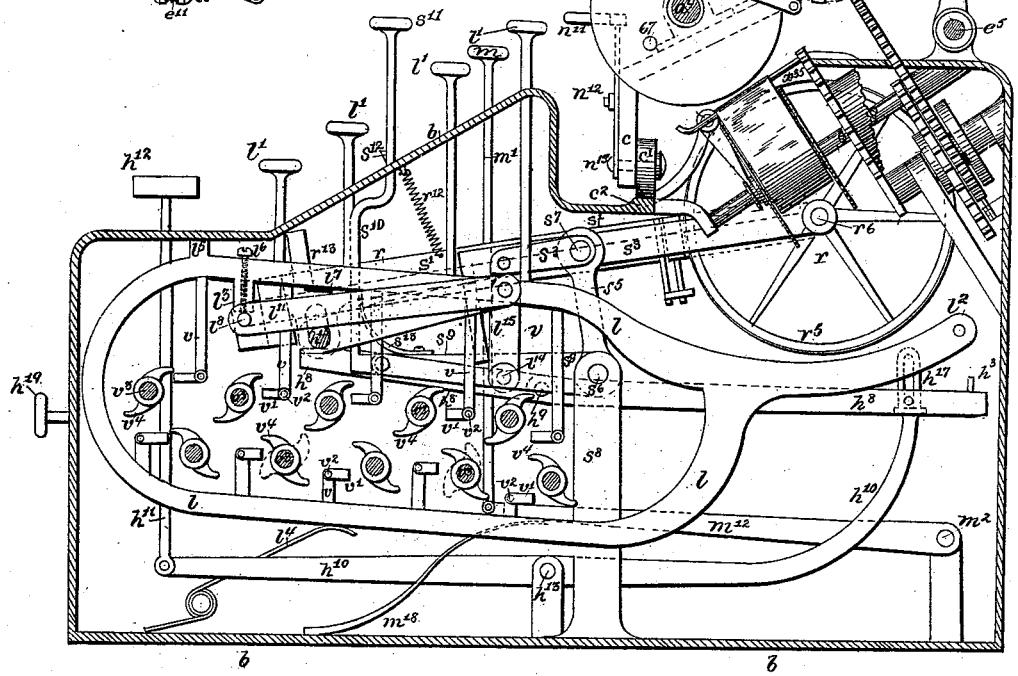
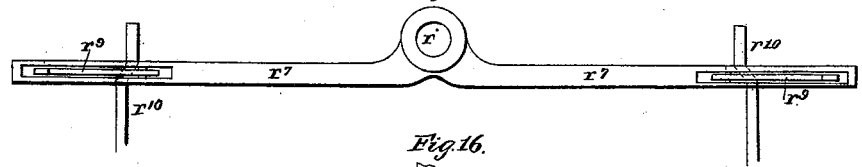
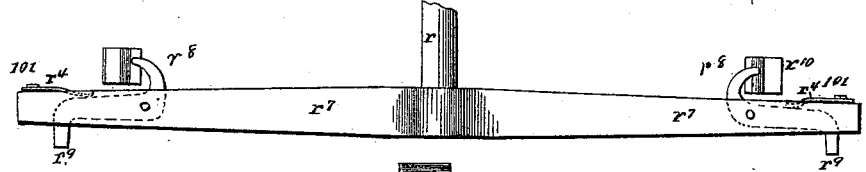

(No Model.) 11 Sheets—Sheet 6.
W. J. PERKINS.
TYPE WRITING MACHINE.
No. 537,993. Patented Apr. 23, 1895.
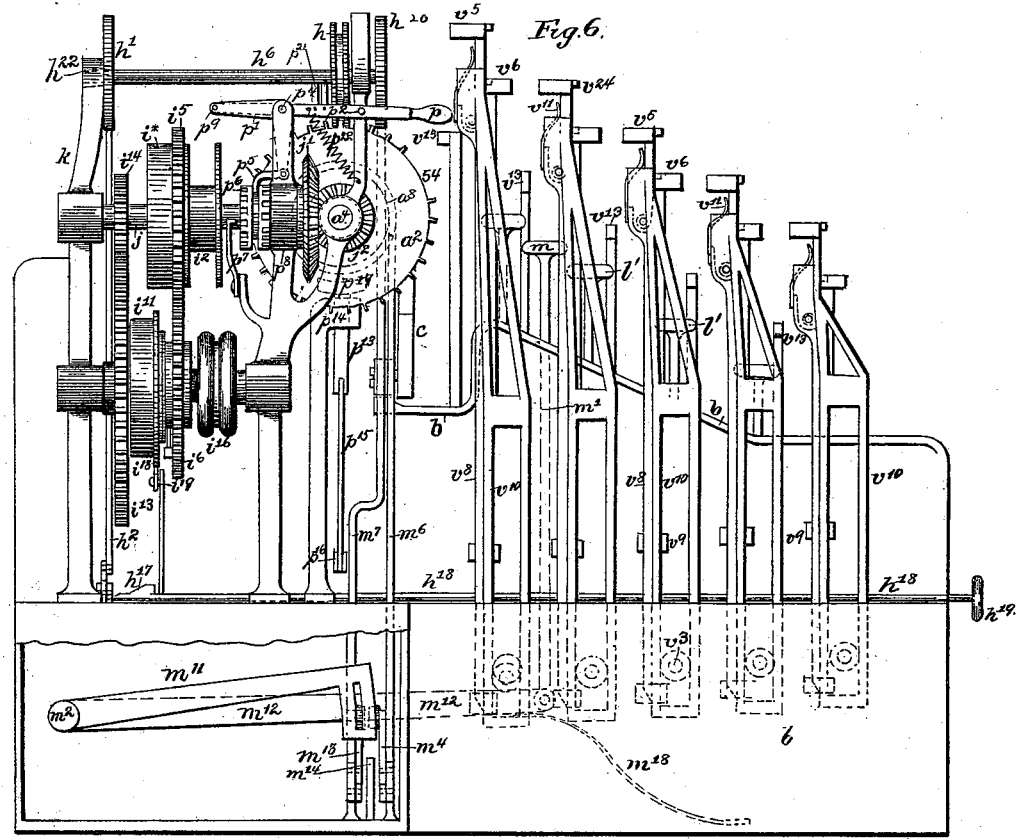
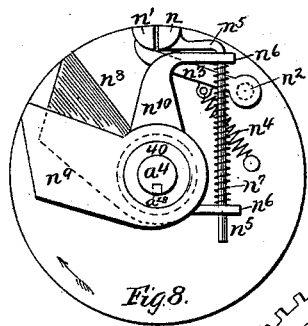
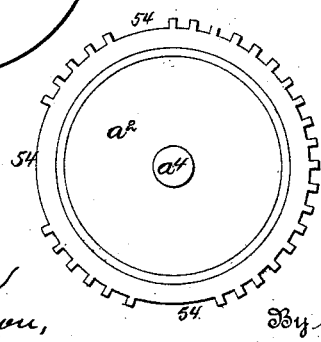
Witnesses
F. B. Brock
C. W. H. Brown
Inventor
Willis J. Perkins
By his Attorney
W. A. Bartlett

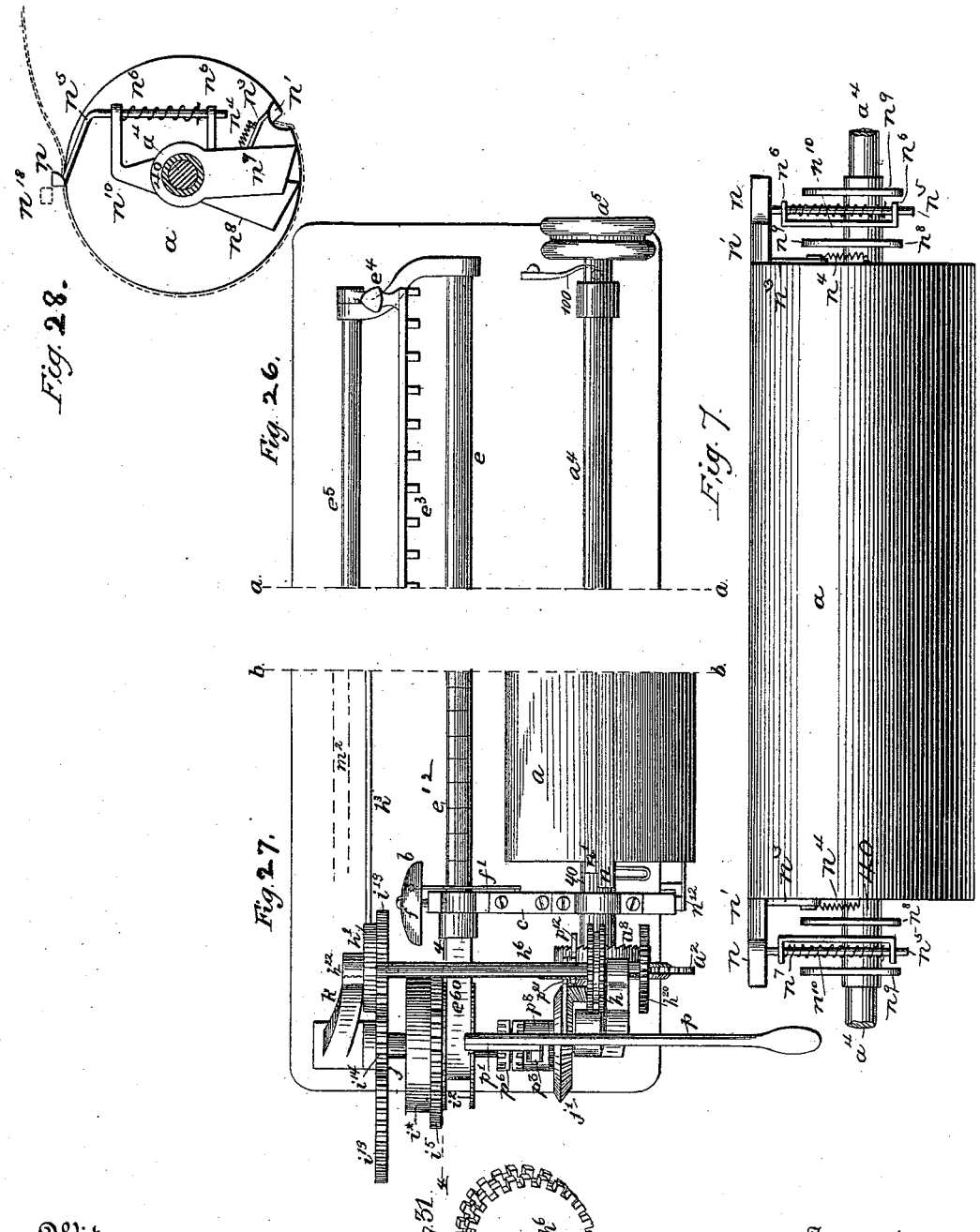

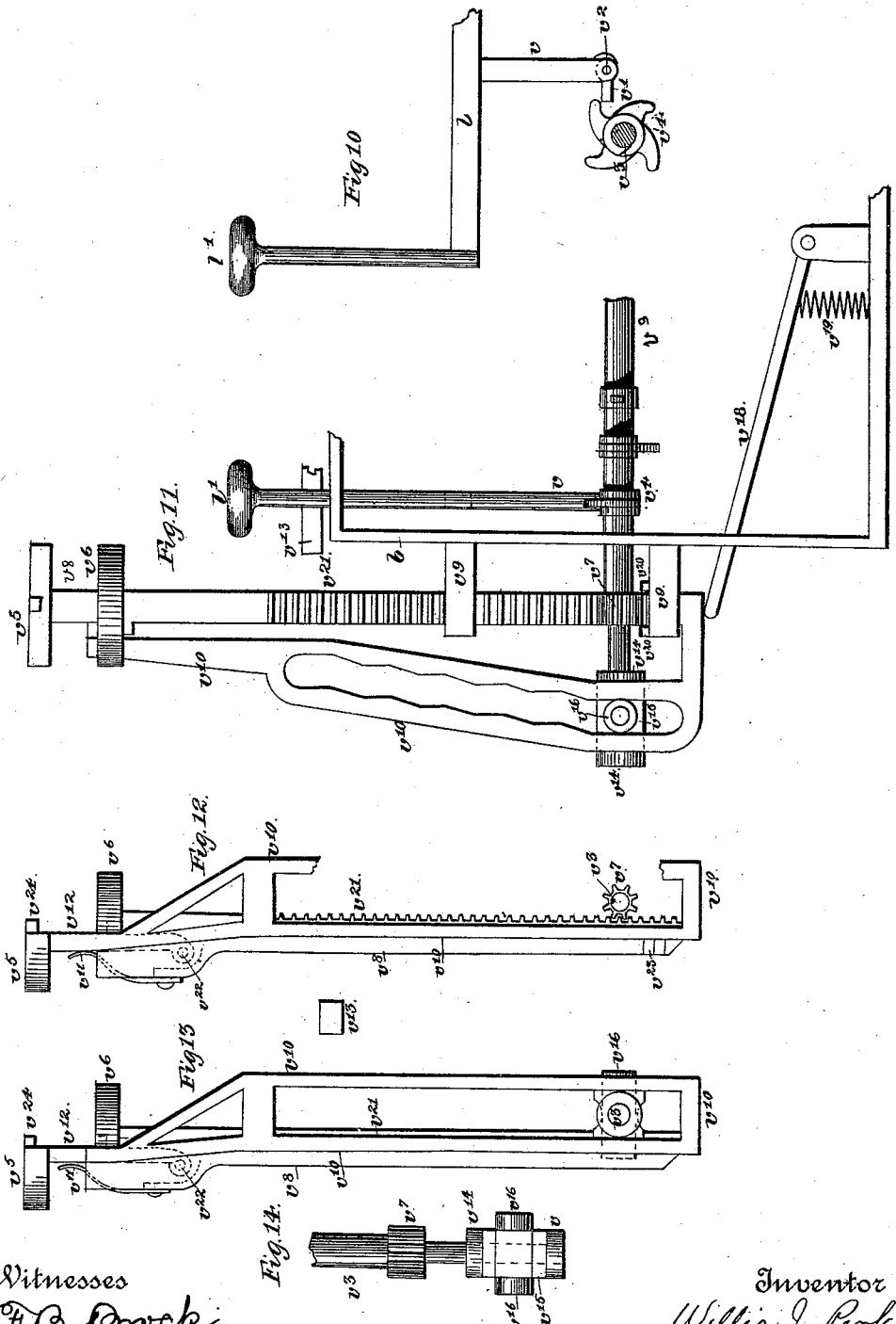

(No Model.) 11 Sheets—Sheet 9.
W. J. PERKINS.
TYPE WRITING MACHINE.
No. 537,993. Patented Apr. 23, 1895.
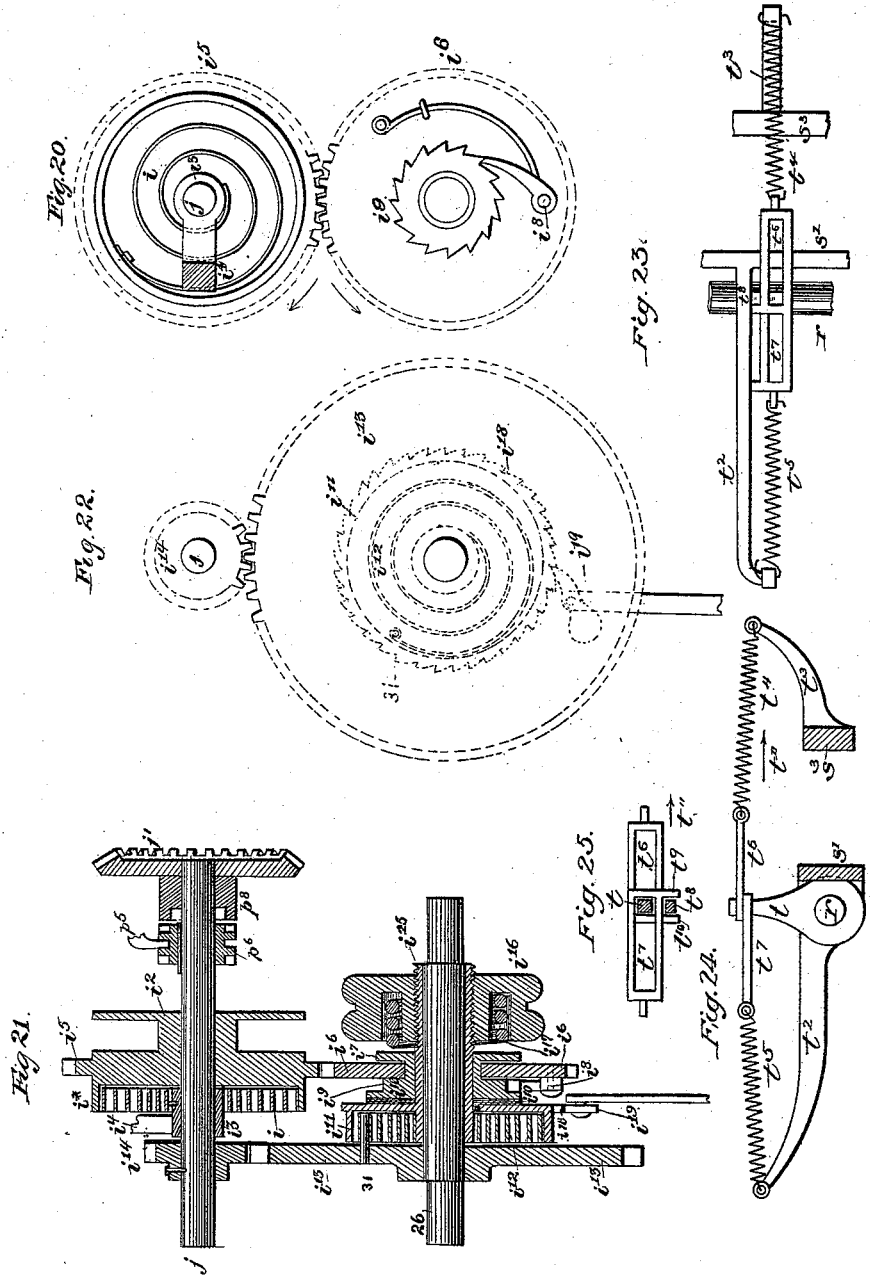

(No Model.)
W. J. PERKINS.
TYPE WRITING MACHINE.
No. 537,993. Patented Apr. 23, 1895.
11 Sheets—Sheet 10.
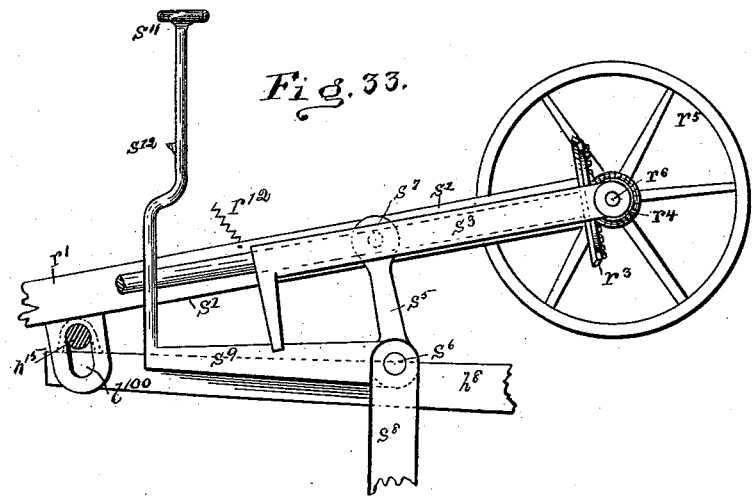
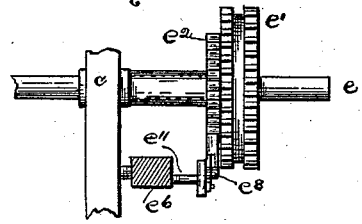
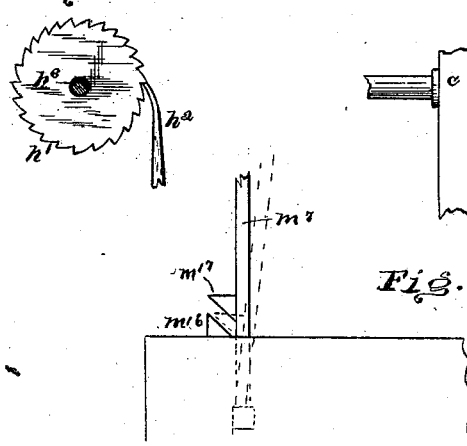

(No Model.) 11 Sheets—Sheet 11.
W. J. PERKINS.
TYPE WRITING MACHINE.

No. 537,993. Patented Apr. 23, 1895.

Attest:
O. B. Brock
C. W. H. Brown

Inventor:
Willis J. Perkins
By atty W. H. Bartlett

UNITED STATES PATENT OFFICE.

WILLIS J. PERKINS, OF GRAND RAPIDS, MICHIGAN.

TYPE-WRITING MACHINE.

SPECIFICATION forming part of Letters Patent No. 537,993, dated April 23, 1895.

Application filed July 24, 1886. Serial No. 208,966. (No model.)

*To all whom it may concern:*

Be it known that I, WILLIS J. PERKINS, residing at Grand Rapids, in the county of Kent and State of Michigan, have invented certain new and useful Improvements in Type-Writing Machines, of which the following is a specification, reference being had therein to the accompanying drawings.

This invention relates to type writing machines and consists in certain improvements in the construction, in the combination of elements, and in the relation of parts.

The object of the invention is to increase the speed of type writing machines, by making the forward movement of the paper practically continuous, dispensing with a return movement until an entire sheet is printed; also to make a printing mechanism by which the letters may be printed separately, or an entire word or part of a word be printed by a stroke of a single key; also to omit one part of a word, or to divide a word by the manipulation of a key; also to make the movement of the paper automatic and continuous from the beginning to the end of the printing of a sheet; also to furnish an improved paper attachment; also to secure an improved apparatus for return movement of paper and correction of errors; also to regulate the automatic spacing between letters, words, and lines, with improved facility, and to adjust said spacing; also to perfect and improve many of the details of type writing machines, as hereinafter pointed out and claimed.

Figure 2:
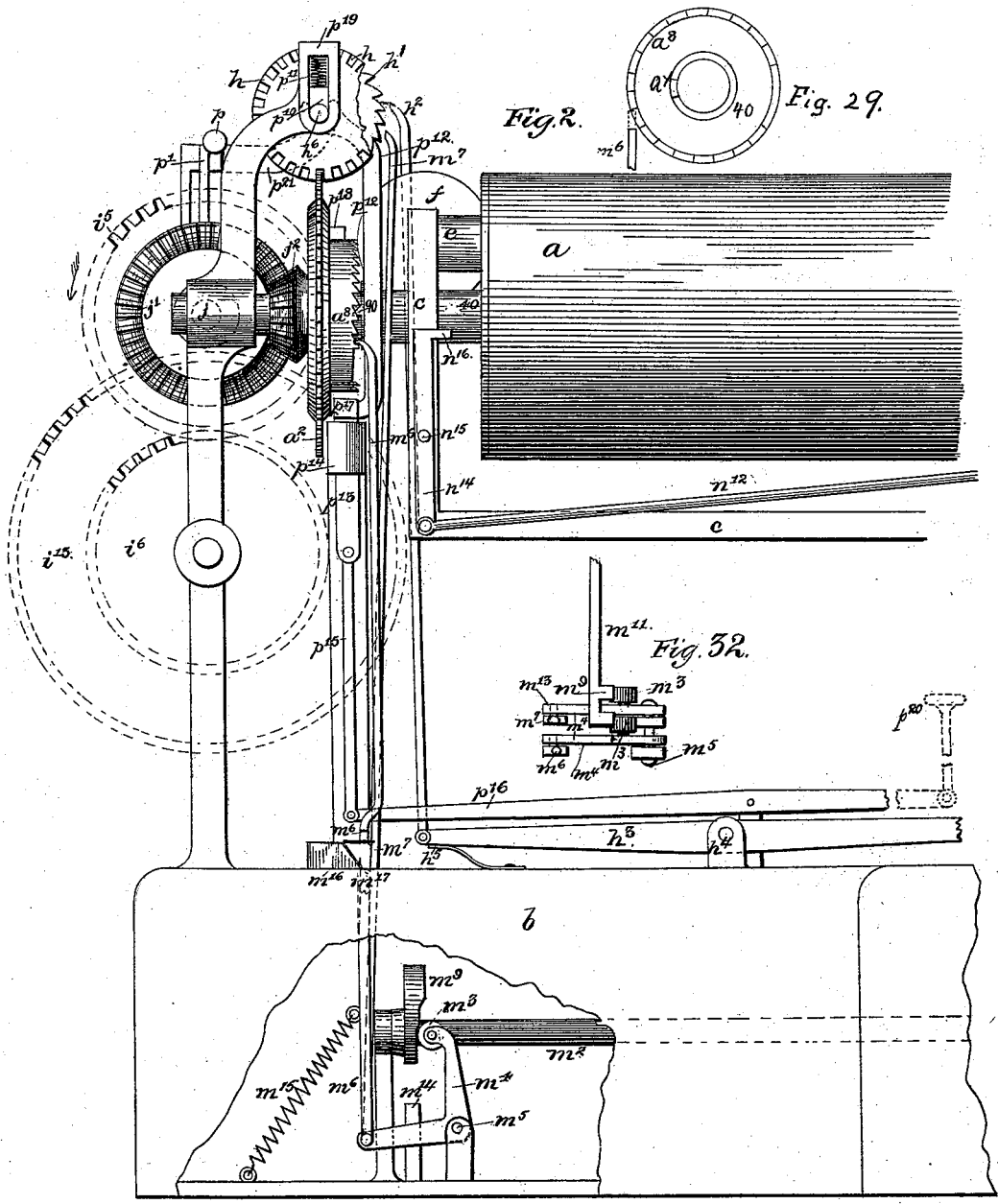
Figure 3:
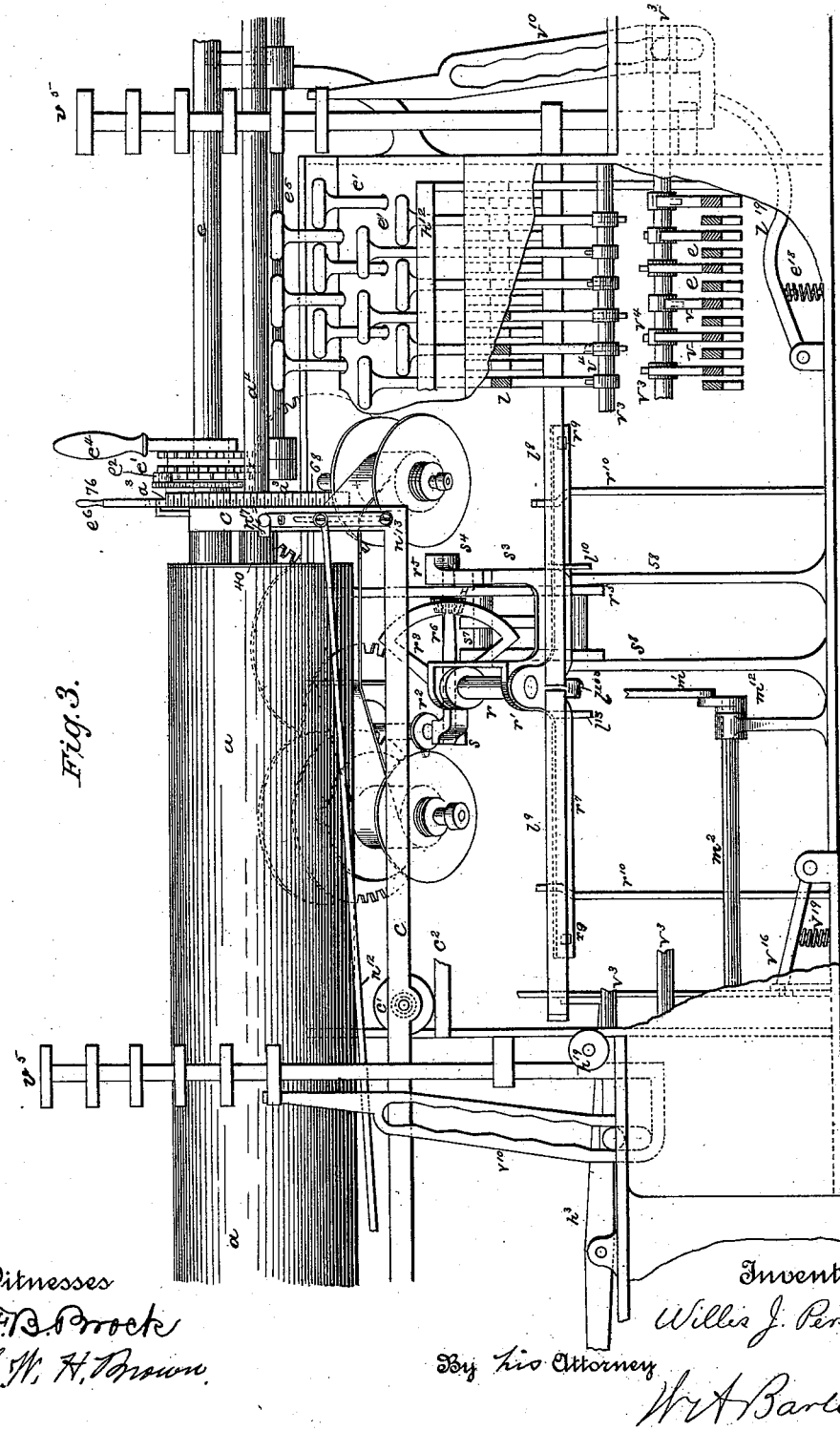
Figure 4:
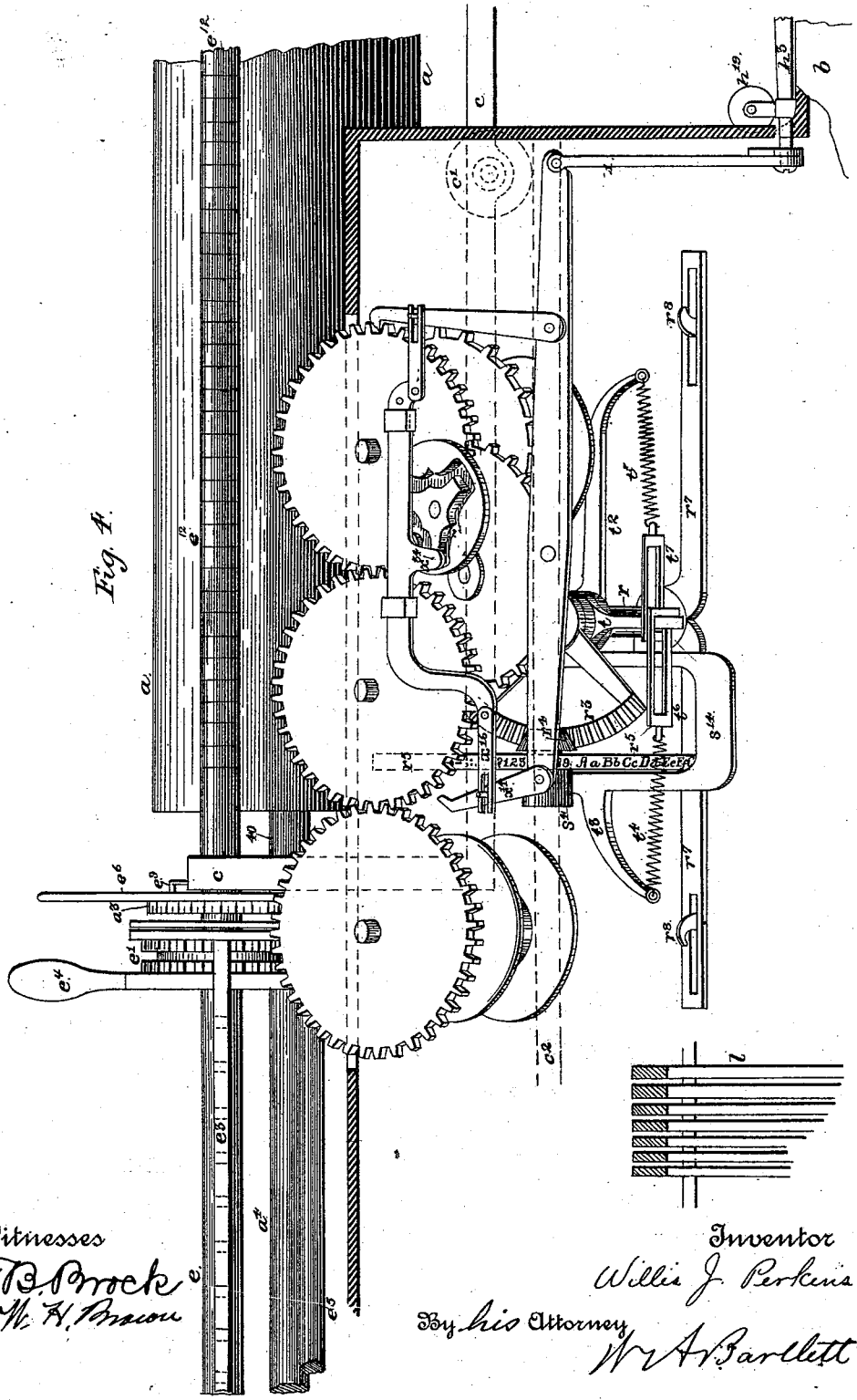
Figure 54:
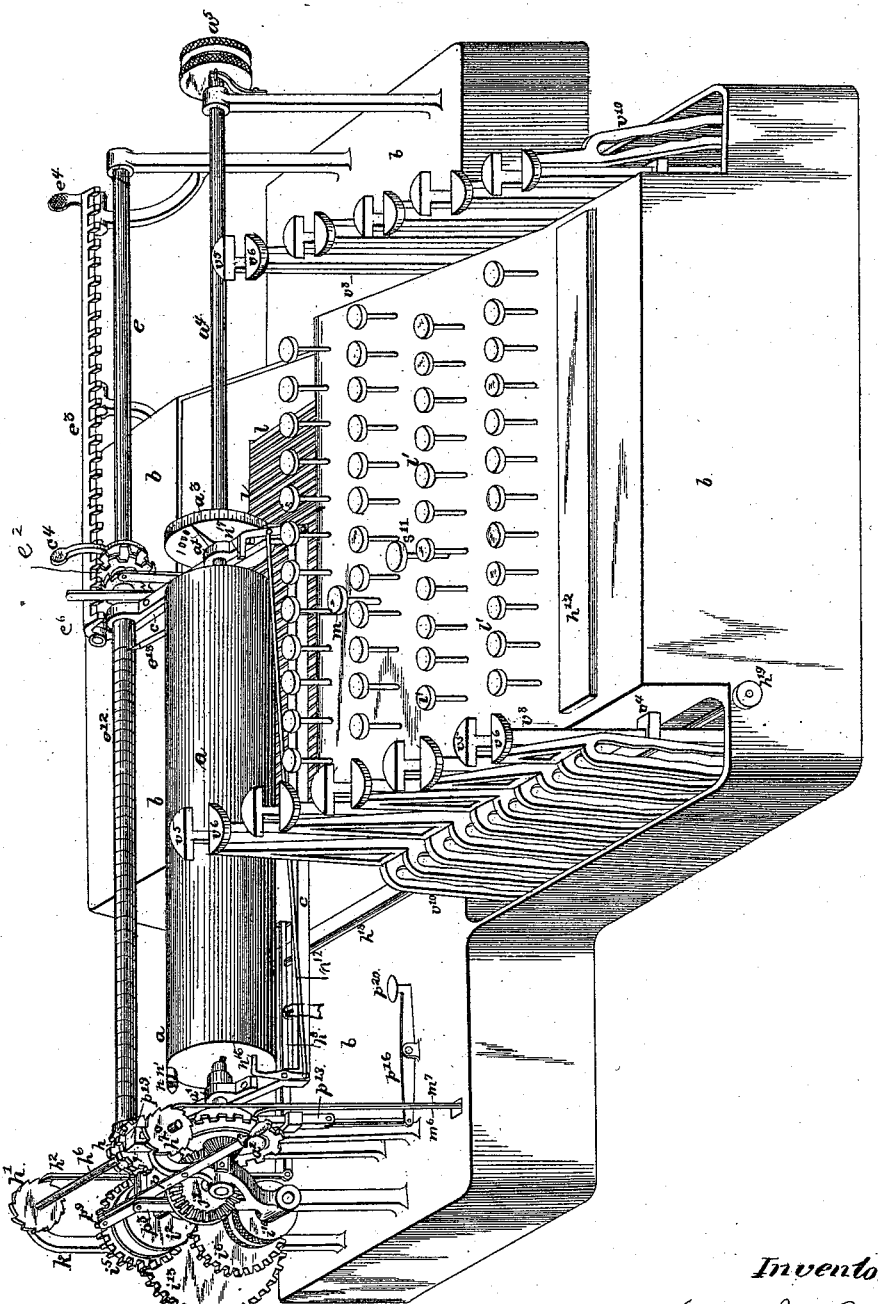

Figure 1 is a plan view of the central portion of the machine, part of the paper cylinder being broken away. The right hand end of the machine is broken away on the line $a-a$, and shown in Fig. 26, and the left hand end being broken away on line $b-b$, and shown detached in Fig. 27. Fig. 2 is a front elevation of the left hand end of the machine, part of the frame being broken away. Fig. 3 is a front elevation of the central portion of the machine, the part shown in Fig. 2 and the right hand end being omitted, the frame being partly broken away. Fig. 4 is a rear elevation of the central portion of the machine, the frame being broken away. Fig. 5 is a vertical transverse section, on line $x-x$ Fig. 1, looking toward the left hand end of the machine. Fig. 6 is an elevation of the left end of the machine, parts being omitted. Fig. 7 is a broken plan or elevation of the paper roll and the sheet holding mechanism. Fig. 8 is an end elevation of the paper carrying roll and its sheet holding mechanism. Fig. 9 is an elevation of a modification of the paper roll gear. Fig. 10 is an end elevation of the tappet rod, and a portion of the letter printing key and lever. Fig. 11 is a side elevation of word printing key, showing part of the tappet rod, all detached. Fig. 12 is an elevation of word printing key and connecting mechanism, all detached. Fig. 13 is an elevation of word printing key and connection to tappet rod, detached. Fig. 14 is a plan of tappet-rod end and connections with which word-printing key engages. Fig. 15 is a plan of type wheel actuating arm. Fig. 16 is an elevation of type wheel actuating arm. Fig. 17 is an end elevation of type wheel actuating arm, and of the trigger operating incline. Fig. 18 is a detail of the line escapement actuating pawl and ratchet, end view. Fig. 19 is a detail front view of line-escapement pawl and connections. Fig. 20 is an illustration of part of spacing mechanism, being a partial section on line 4—4 Fig. 27. Fig. 21 is a section on the line of the axis of the shafts of spacing mechanism and train. Fig. 22 is a diagrammatic end view of part of spacing mechanism. Fig. 23 is a plan of type wheel momentum spring and connections, unnecessary parts being omitted. Fig. 24 is an elevation of momentum springs and connections, partly sectioned. Fig. 25 is a detail of loops with which momentum springs are connected. Fig. 26 is a plan of the right hand end of the machine. Fig. 27 is a plan of the left hand end of the machine. Fig. 28 is an end view of the paper holding roll and attachments. Fig. 29 is an elevation or diagram showing pawl engagement with ratchet wheel. Fig. 30 is a detail or diagram showing a broken pawl with an incline thereon, and an incline on the frame. Fig. 31 is a perspective of escapement wheel. Fig. 32 is a detail plan partly in section of the paper roll reversing apparatus. Fig. 33 is a detail of the apparatus for shifting type wheel. Fig. 34 is a perspective view of the type writer, some details, (as the paper holding devices) being omitted for clearness of illustration. Fig. 35 is a detail showing engagement of pawl $h^2$ with ratchet wheel. Fig. 36 is a detail showing part of the escapement gear which controls carriage movement.

Certain figures of drawings originally filed with this application have been canceled herein and are embraced in a new application filed July 28, 1892, Serial No. 441,530, hereinafter referred to.

Owing to the complex construction of the machine, parts are omitted in many of the figures, and parts are shown broken, and in some instances only the position of a part is indicated.

In Fig. 2 there is a diagrammatic illustration showing the position of a pawl with relation to a disk ratchet, showing how the lifting of the pawl will engage the teeth on the face of the disk, while the disk is free to rotate when the pawl is depressed.

The type-writer has preferably a box-frame $b$, containing the key levers, type wheel, inking apparatus, &c. Outside the frame is the key board, paper roll and its operating mechanism, and some parts of the word-printing apparatus.

The reference letter $a$ indicates the paper-carrying roll, mounted on a shaft $a^4$, to which the roll is splined or otherwise attached so as to rotate with said shaft, but the roll is free to move longitudinally of the shaft when suitably actuated. A spline is shown at $a^{13}$.

The paper roll $a$ is held from bearing its weight on shaft $a^4$ by a carriage $c$, in which carriage the sleeves 40 on the paper roll rest. The front bar of this carriage $c$ is supported by a wheel $c'$ running on a track $c^2$ on the frame, and by journal bearings on rod $e$. The paper roll carriage has a flexible band or chain $e^{60}$ attached to one end, and running over winding drum $i^2$. The band $e^{60}$ is at all times held taut by a spring $i$, in barrel $i^*$, tending to rotate the drum $i^2$ so as to draw the carriage to that end of the machine. The spring $i$ has one end attached to barrel $i^*$, which is attached to drum $i^2$. The other end of spring $i$ is attached to sleeve $i^3$ loosely mounted on shaft $j$ but is prevented from turning with the shaft $j$ by an arm engaging stop $i^4$ from the frame. (See Fig. 20.) A gear $i^5$ on the exterior of barrel $i^*$ engages a gear $i^6$ loosely mounted on sleeve $i^7$. To the gear $i^6$ a pawl $i^8$ is attached, which pawl engages ratchet $i^9$ on sleeve $i^7$. (See Fig. 21.) A friction disk $i^{10}$ between the sleeve $i^7$ and the barrel $i^{11}$, serves to drive the barrel $i^{11}$ in the direction the sleeve $i^7$ is moving, when said sleeve is forced in the direction of said barrel, as will be hereinafter explained.

The barrel $i^{11}$ contains a coil spring $i^{12}$, one end of the spring being connected to the barrel, or to the long sleeve $i^{25}$ on shaft 26, which sleeve is connected to the barrel, or is integral therewith. The other end of spring $i^{12}$ is attached to a stud or pin 31 on gear wheel $i^{13}$, which gear wheel $i^{13}$ meshes with gear $i^{14}$ rigidly secured to shaft $j$. See Figs. 2, 21, and 27. The barrel $i^{11}$ has a ratchet $i^{18}$ surrounding it, with which ratchet a pawl $i^{19}$ engages, this pawl being mounted on a standard on the frame. This pawl prevents the backward movement of barrel $i^{11}$. The long sleeve $i^{25}$ has a screw thread at one end, with which thread the thumb nut $i^{16}$ engages, and an interposed spring $i^{17}$ presses the sleeve $i^7$ against the friction disk $i^{10}$, Fig. 21.

Shaft $j$ gears with the paper roll shaft $a^4$ by means of bevel gears $j'$ and $j^2$. The gear $j^2$ is fast or integral with wheel $a^8$, which is held to shaft $a^4$ by a single tooth clutch, as hereinafter explained. See particularly Fig. 2. Thus the force which revolves shaft $j$ will also revolve the paper roll, provided all the parts are in gear. (See Fig. 2.)

The spring $i^{17}$ merely regulates the frictional contact between the driving sleeve $i^7$ and the driven wheel $i^{11}$, so that the force transmitted shall not be great enough to break any of the parts, as the friction gear will slip before a breaking strain is reached.

Spring $i$, when wound up, will have a constant tendency to draw the carriage, through the drum $i^2$ and connections. Spring $i^{12}$ will tend to rotate shaft $j$, which is connected by gearing to rotate the paper holding roll. The springs are "wound up" or placed under tension by drawing the paper carriage to the right hand end of the machine, the band $e^{60}$ serving to wind the springs.

The paper cylinder $a$ is held from rotation, save as the requirements of the writing call for such rotation, by an escapement, which will now be described. (See particularly Figs. 2, 6 and 27.)

A shaft $h^6$, mounted in suitable bearings in standards on the frame carries a double toothed wheel $h$ which acts as an escapement, in connection with wheel $a^2$ on shaft $a^4$. This wheel $h$ is composed of a central drum and a gear at each side thereof, the teeth of the gear being about equal in width to the interdental spaces, and the teeth of one gear being opposite the spaces in the other. (See Fig. 31.) The gear $a^2$ on shaft $a^4$, makes engagement with the flat or disk sides of the teeth of gear $h$. As the tendency of the shaft $a^4$ and its gear $a^2$ is to rotate, a tooth of wheel $a^2$ will be brought against the side of one of the teeth of the gear $h$. A pawl $h^2$, connected to the key mechanism of the machine and engaging ratchet wheel $h'$ on shaft $h^6$, rotates the shaft $h^6$ slightly with each impulse to a key or spacing lever on the key-board. This slight rotation of shaft $h^6$ carries one of the teeth of gear $h$ away from the front of a tooth on gear $a^2$, thus permitting that gear to move forward the distance of one tooth. This revolves the paper roll on its axis the distance necessary to present a new surface of paper to the type. Pawl $h^2$ is pivoted to lever $h^3$, which lever $h^3$ is pivoted on the frame at $h^4$. The inner end of lever $h^3$ rests on lever $h^8$, which lever $h^8$ is pivoted to the frame at $h^9$, and secured at the front end to the shifting bar, $h^{15}$, which passes under the levers of all the keys on the key board, and is depressed when any key is struck. This depression of shifting bar $h^{15}$, through the lever connections already explained, depresses pawl $h^2$ whenever a key on the key-board is struck. As soon as the shifting bar $h^{15}$ is released, the spring $h^5$ raises the pawl $h^2$, which turns the ratchet $h'$, and thereby the shaft $h^6$. This slight movement of shaft $h^6$ releases one tooth of the toothed wheel $a^2$ from the escapement $h$, thus allowing the paper roll to turn slightly on its axis under the impulse of the spring $i^{12}$. The rise of pawl $h^2$ is controlled by a push bar $h^{18}$ having a terminal button $h^{19}$, and having one or more bearing surfaces $h^{17}$ at such position that these bearing surfaces will come under the lever $h^3$ and serve as stops for the movement of the same. (See Figs. 1 and 6.) By drawing out the push bar $h^{18}$ the limit of movement of lever $h^3$ may be increased, thus increasing the throw of pawl $h^2$. By this adjustment the escapement may be operated to free one, two, or more teeth of wheel $a^2$, from the escapement, so that the printed letters may be differently spaced in the word. For spacing between words in the line the spacing bar $h^{12}$ is depressed. This acts upon pawl $h^2$ through lever $h^3$ and connections. The bar $h^{15}$ runs under all the key levers, as will be hereinafter explained. This bar $h^{15}$ is fastened to lever $h^8$, journaled on pivots $h^9$ to the frame. The long arm of lever $h^8$ is connected with lever $h^3$, and thus causes a movement of said lever, by means of the key movement, as will be hereinafter explained.

The paper roll is of such circumference that a sheet of paper surrounds it. The lines as written go nearly around the cylinder, not lengthwise thereof.

To secure a proper margin at the end of one line and the beginning of the next line, a space in the periphery of gear $a^2$ is left without teeth, as at 54. When this space arrives next the escapement wheel $h$ the wheel $a^2$ and paper roll will rotate a distance equal to the width of the space 54, and so carry the sheet around from the end of one line to the beginning of the next. By making wheel $a^2$ with a number of broken spaces 54, (Fig. 9,) a partial rotation of the paper roll or cylinder at each of these spaces will take place without retardation by the escapement wheel $h$, and the matter on the roll may thus be printed in columns, the width of the spaces on the wheel $a^2$, between the teeth, determining the width of blank space between the words or figures in the columns. By having a number of mutilated gear wheels $a^2$, (the same being readily interchangeable,) tabular work of various kinds may be performed on this machine, without loss of time for shifting the paper roll past the blank spaces. When the end of a line is nearly reached, the stop $n$ on the paper cylinder $a$ engages the clapper $f'$, and so sounds the bell $f$. (See Fig. 27.)

The longitudinal movement of the paper roll, which determines the distance between the lines, on the paper will now be described.

A rack bar $e^3$, (Figs. 1, 5 and 26) is pivoted to shaft $e^5$, and has teeth projecting toward the front of the machine. This rack bar is held by its bearings or otherwise so that it will not fall forward, but may be swung back on its pivot. An escapement wheel $e'$, precisely like the wheel $h$, hereinbefore described, is mounted on the shaft $e$ so as to rotate freely thereon, and is attached to carriage $c$ so as to partake of the endwise movement of said carriage. A lever $e^6$, pivoted to the carriage, has a stud 60 attached thereto, and a bell-crank lever $e^{10}$ is pivoted on the end of said stud, and pressed back by spring $e^{11}$. This bell-crank lever $e^{10}$ has a pawl $e^8$ attached to its upper end, and the pawl $e^8$ engages a ratchet $e^2$ on or integral with escapement wheel $e'$. The lever $e^6$ may be swung into various positions, and secured by a spring $e^9$ entering one of several holes or stops in said lever. This adjustment of the lever $e^6$ will project the front arm of bell crank $e^{10}$ more or less into the path of movement of a pin or stop 67 on the dial wheel $a^3$. Dial wheel $a^3$ on one of the sleeves 40 partakes of the movement of paper roll $a$. As the dial wheel rotates its pin 67 engages bell crank lever $e^{10}$, for a longer or shorter time, according to the position of lever $e^6$. The pin lifts on the crank arm and so rotates escapement wheel $e^2$ through the pawl and ratchet mechanism described, and as the spaces in the escapement wheel come opposite the teeth in rack $e^3$ the carriage will be drawn along by the cord $e^{60}$ and the spring drum $i^*$, the rack teeth passing through the spaces in the escapement wheel. The position of the lever $e^6$ determines the amount of the rotation given to the wheel $e'$ (through the pawl and ratchet connections) by the pin, abutment or projection 67 on the dial wheel $a^3$. The rotation of wheel $e'$ permits the passage of the teeth of rack $e^3$ alternately through the interdental spaces of the wheel $e'$, and thus the lines may be as far apart as the teeth on the rack bar, or a multiple of that distance.

The rotary movement of double-toothed wheel $e^2$ a distance equal to the space between the teeth permits one tooth of the rack bar $e^3$ to pass through the interdental spaces in the escapement wheel $e'$ and the pull on the band $e^6$ will draw the paper carriage and roll the distance of one tooth in the rack bar, thus moving the paper roll longitudinally to give a space equal to the distance between the lines.

The operation of both the escapements is automatic, through the power stored in the springs $i$ and $i^{12}$ so that when a line is begun the operator can continue to the end of the line, the escapement $h$ regulating the space between letters, and the space between words being given by touch of the spacing bar, in usual manner. When the end of the line is reached the paper roll revolves, by reason of the mutilated gear $a^2$ until the place for the beginning of the next line is reached, and this rotation, by means of the escapement wheel $e'$ and its connections and the rack $e^3$ also causes the paper roll $a$ to move endwise as far as the distance between the lines, thus permitting the operator to proceed without loss of time in returning the paper roll to position.

When a new sheet of paper is to be applied to the paper roll, the rack $e^3$ is swung back on its pivot $e^5$, by the operator taking hold of catch $e^4$. The paper carriage and its roll may then be drawn to the right, by the operator taking hold of catch or handle $c^4$ with his other hand. This movement of the carriage to the right winds up the springs $i$ and $i^{12}$, through the medium of the flexible band $e^{60}$ and the train of gearing, as has been explained.

It often happens in operating a type-writer that the wrong letter is impressed on the paper, and it is desirable to move the paper roll back a single space without such delay as would be necessary in uncoupling the escapement mechanism. I accomplish the setting back of the paper cylinder a single space by a single stroke of a button or key, in the following manner: A button $m$ on the stem $m'$ Fig. 6 is fastened to one end of arm $m^{12}$ which is attached to rod $m^2$ journaled in the frame. The key $m'$ and connections may be called the reversing or set back bar. An arm $m^{11}$ extending forward from the journaled rod $m^2$, has cam faces $m^9$ at its side, Fig. 2. These cam faces $m^9$ bear against friction rolls $m^3$ or similar devices in the ends of bell crank levers $m^4$ and $m^{13}$, which bell cranks are suitably pivoted, as at $m^5$, (Figs. 2 and 6.) Pawl $m^6$ pivoted to one arm of bell crank lever $m^4$ engages at its upper end with a ratchet $a^8$ which is secured by a coupling hereinafter described to shaft $a^4$, so that a lifting of said pawl $m^6$ will tend to rotate the shaft $a^4$ backward. The end of said pawl $m^6$ is below the center of the ratchet $a^8$, when the pawl is depressed, and is so far from the axis of said ratchet that when depressed the pawl has no engagement with the ratchet. When lifted, the pawl first rises into contact with the teeth on the face of the ratchet, and its further movement rotates the ratchet wheel, and with it the shaft $a^4$ and the paper roll; but the escapement mechanism will not, while in engagement, permit shaft $a^4$ to turn backward, without a movement of the escapement. This is effected by pawl $m^7$ engaging ratchet $h^{20}$ on shaft $h^6$. The cam faces or inclines $m^9$ are relatively arranged so that the escapement is unlocked just before the roll reversing pawl $m^6$ comes into action. Both pawls $m^6$ and $m^7$ have a movement greater than is necessary to move the ratchets the space of one tooth. The pawls will disengage themselves from the ratchets by dropping below the plane at which the ends of the pawls engage the teeth on the ratchets; or the pawls may be thrown out of engagement on their descent by such a device as is illustrated in Fig. 2, where an inclined projection $m^{17}$ on the pawl $m^7$ engages an incline $m^{16}$ on the frame, thus pressing the pawl to one side. The ratchet wheel $a^8$ has a mutilated surface to correspond with the space 54 in the escapement wheel $a^2$. A spring $m^{18}$, (Fig. 6) returns the button $m$ to place as soon as the pressure is released. Springs $m^{15}$ return the pawls $m^6$ $m^7$ to depressed position at the same time. These springs have proper connection with the frame and with the movable parts which they restore to position.

The dial wheel $a^3$ is attached to one end of one of the sleeves 40 that projects from the end of paper roll $a$. The edge of the dial $a^3$ is indexed, and a pointer 1000 on carriage $c$ indicates the position at which the type wheel will print the next letter.

The part $e^{12}$ of the rod $e$ Fig. 1 connecting the ends of carriage $c$ is spaced and numbered, and an index $e^{13}$ attached to the frame $b$ points out to the operator the line with which the type wheel will register. See Fig. 34.

In order to "indent" at the beginning of a line, it is desirable that the paper roll should quickly rotate as far as desired. To permit this, the mechanism hereinafter described is provided, to throw the letter spacing escapement out of engagement.

Shaft $h^6$ Figs. 2 and 6, has a slight play in box $h^{22}$, at the rear end. The front of said shaft $h^6$ rests in an elongated box $p^{19}$, and has a cap $p^{10}$ held down by spring $p^{11}$ in said box. (See Fig. 2.) A vertical rod $p^{12}$ has its upper end resting against the shaft $h^6$. (The rod $p^{12}$ may curve, as shown, to pass the ratchet gear $a^8$.) The rod $p^{12}$ has a projection $p^{17}$ which comes under the periphery of ratchet wheel $a^8$, or a friction disk attached to said ratchet, said disk bearing a stop $p^{18}$. The downward extension of rod $p^{12}$ is made to fit in a bearing $p^{14}$, as at $p^{13}$, and the pitman $p^{15}$ connects said rod with the lever $p^{16}$, which lever runs back to the key board, and has an operating button $p^{20}$ attached to it. By depressing the button or key $p^{20}$ the pitman $p^{15}$ will be raised, thus raising the rod $p^{12}$, and so lifting the shaft $h^6$ and the escapement wheel $h$ out of engagement with the gear $a^2$. This permits the gear $a^2$ and the paper roll to rotate under the influence of the propelling springs, so long as the pressure is maintained on button $p^{20}$, or until the stop $p^{18}$ comes in contact with the brake shoe $p^{17}$, when the rotation will cease. The pressure of the brake $p^{17}$ on the periphery of the friction disk determines the speed of rotation of the paper roll.

To free the paper roll entirely from the spring actuating device and the escapement $h$, so that the cylinder may be rotated in either direction, the following mechanism is provided: A lever $p$, pivoted on standard $p^2$, is pivoted at its end $p^9$ to the upper arm of a bell-crank lever $p'$, which bell-crank lever is pivoted to a standard from the frame. The lower arm of the bell-crank $p'$ has a fork $p^5$ which engages a groove in the clutch $p^6$, on shaft $j$, the clutch $p^6$ being the driving clutch splined to shaft $j$, and serving to drive bevel gear $j'$ when in engagement therewith, but leaving bevel gear $j'$ free to rotate on shaft $j$ when the clutch is not coupled. A catch $p^7$ on the frame or standard serves to engage the end of clutch $p^6$ when the latter is thrown out of engagement with bevel gear $j'$, Fig. 6. The lever $p$ bears an arm $p^{21}$ which extends under shaft $h^6$, Fig. 27. Now when the outer end of lever $p$ is pressed down, the arm $p^{21}$ immediately lifts shaft $h^6$ and escapement wheel $h$ out of engagement with the gear $a^2$. At the same time the bell crank lever $p'$ uncouples clutch $p^6$ from the bevel gear $j'$, leaving the paper roll $a$ free to rotate, (which rotation may be effected by taking hold of knob $a^5$ on the end of shaft $a^4$.)

While disengaging the clutch from gear $j'$, the mechanism just described shifts the clutch into engagement with the fixed stop or catch $p^7$, so that the springs $i$ and $i^{12}$ shall now be permitted to run down.

The mechanism for attaching sheets of paper to the paper roll or cylinder will now be described. (See Figs. 7 and 8.)

The roll or cylinder $a$ is composed of light material, as sheet metal. The ends of the roll are journaled in the carriage $c$ by sleeves 40 through which the shaft $a^4$ passes. The cylinder $a$ has a longitudinal groove in its face, extending from end to end of the roll. This groove receives two rods $n$ and $n'$, the outer faces of the rods having a curved surface exactly conforming to the outline of roll $a$, so that when the rods are in the groove the cylinder is complete. The rod $n'$ is shorter than the rod $n$. Rod $n$ is pressed down in the groove by spring $n^7$, which draws in the link $n^5$, on which rod $n$ is supported, the link $n^5$ sliding in boxes $n^6$, which boxes are in extensions of arm $n^{10}$. The two ends of the paper roll $a$ are alike in respect to these attachments. Arm $n^{10}$ is journaled on the sleeve 40, or a collar surrounding said sleeve. Two cam bars, $n^9$ and $n^8$, are journaled on this sleeve 40. One of these cam bars $n^8$ is inside of arm $n^{10}$. The other cam bar $n^9$ is outside said arm, that is, farther from the end of the paper roll. On the front side of carriage $c$ are stops $n^{16}$ and $n^{17}$, (Figs. 2 and 3) in position to engage the cams $n^9$, and the ends of bar $n$, when rocked on pivots $n^{13}$ and $n^{15}$, by means of connecting bar $n^{12}$. The connecting bar $n^{12}$ connects the stops $n^{16}$ and $n^{17}$ from opposite sides of their pivots, so that both will swing toward or away from the roll at the same time. Bar $n^{12}$ has a handle $n^{11}$ for shifting its position lengthwise. The rod $n'$ lies alongside of rod $n$ in the groove in the paper roll, and is held in the groove by spring $n^4$, pulling down on links $n^3$ which are attached to the ends of rod $n'$ where said ends overhang the ends of the roll. The links $n^3$ are pivoted to the end of the roll $a$, as at $n^2$. The cams $n^8$ are similar to the cams $n^9$, but are attached to the sleeve on shaft $a^4$ between the arms $n^{10}$ and the end of the paper roll, in such position that both sets of cams turn with shaft $a^4$, and one pair of cams acts on rod $n'$, but not on the rod $n$, and vice versa. The cams $n^8$ and $n^9$ may be held from rotation by the stops $n^{16}$ and $n^{17}$ when these stops are turned inwardly far enough to serve as abutments, but these stops $n^{16}$ and $n^{17}$ can be turned in far enough to engage the rod $n$ without engaging the cams. It will be apparent that the rods $n$ $n'$ may be manipulated by hand, without regard to the stops $n^{16}$ and $n^{17}$.

To attach a sheet to the roll $a$, the stops $n^{16}$ and $n^{17}$ are shifted toward the roll, bringing these stops in range with the cams $n^9$. Now by uncoupling the paper roll from its driving gear, the roll may be revolved in the direction of the arrow in Fig. 8 by taking hold of button $a^5$. As the roll $a$ revolves the cams $n^9$ being held by stops $n^{16}$ and $n^{17}$ come in contact with the overhanging ends of rod $n$, and raise the rod out of the groove in the roll, and carry said rod $n$ forward over the rod $n'$, (that is, lift said rod and the roll swings round with reference to it.) Cams $n^8$ now come in play, and lift rod $n'$ in similar manner. Both the rods being now out of the groove in the paper roll, one edge of the sheet is slipped under the rods, and the further revolution of the roll causes rod $n'$ to pass off the cams $n^8$, and drop into the groove, thereby clamping the edge of the paper in the groove. The stops $n^{16}$ and $n^{17}$ are now thrown back so that they will no longer engage the cams $n^9$, but are still in front of the ends of bar $n$. Now the rotation of the roll $a$ is continued, and rod $n$ being held by the stops, allows the periphery of roll $a$ to turn under it, so that rod $n$ serves as a scraper or wiper, and smoothes the paper in front of it, until the rotation of the roll is complete, when rod $n$ snaps down on the edge of the sheet, disengaging itself from stops $n^{16}$ and $n^{17}$. The sheet is readily disengaged by releasing rods $n$ and $n'$.

To turn the roll by means of button $a^5$, on shaft $a^4$ it is only necessary to pull the button $a^5$ to the right, when a one toothed clutch 90 (Fig. 2) engaging a single notch $a^x$ (Fig. 29) in the face of ratchet $a^8$, will be released from said ratchet, and the shaft $a^4$ and roll $a$ may then be turned by hand. As the clutch 90 has but a single point of engagement with the ratchet $a^8$, the roll $a$ must be re-engaged with the clutch in the same position. So if the roll is disengaged and turned back to read proof, it will be sure to re-engage in the old position and the work will proceed from where it stopped. The spring 100 (Fig. 26) serves to shift the shaft $a^4$ endwise so that the clutch 90 will remain in engagement unless purposely released.

The type wheel or disk $r^5$ has a series of numbers, characters, indices, or letters around its periphery, the capitals and small letters being side by side. The disk also carries such numerals and points as are used in printing.

The impression is given by bringing the edge of the disk in contact with the inking ribbon and so pressing the ribbon against the paper.

The keys or buttons $l'$, (best shown in Fig. 5) are connected to the key levers $l$ by a suitable shank. Levers $l$ are pivoted at $l^2$. Projections $l^3$ on levers $l$, engage with the type driving rods $l^8$ and $l^9$, these rods being independent of each other, one passing under all the key levers at one side of the middle of key board and the other under all those at the other side. Stops $l^5$ determine the upward movement of the lever, and springs $l^4$ lift them upward. The rod $l^8$ is hung on arms $l^{10}$ and $l^{11}$, which arms are fastened to links $l^{15}$, rigidly attached to rock shaft $l^{14}$. Rod $l^9$ is similarly mounted on arms $l^{12}$ $l^{13}$, and connected to shaft $l^{14}$. All the parts bear the relation shown in full or dotted lines of Fig. 1. The rods or cross bars $l^8$ and $l^9$, when depressed, bear on the triggers $r^9$, which triggers are pivoted, one at either end, in the arm $r^7$, which arm is firmly keyed to the type wheel driving shaft $r$. Driving shaft $r$ is journaled in bearings $r'$ and $r^2$, so as to have a limited oscillation on its axis. The depression of a key lever at the right hand side of the key board depresses the bar $l^8$, which engages the right hand trigger $r^9$, on bar $r^7$ and so rocks shaft $r$. The depression of a key at the left side depresses bar $l^9$, engaging the left hand trigger $r^9$, and so rocking the shaft $r$ in reverse direction.

The length of the extension $l^3$ on the key lever determines the amount of depression of bars $l^8$ and $l^9$, and thus oscillates the driving shaft $r$, through the intermediate mechanism described, so far as is necessary to transmit the proper amount of rotation to the driving shaft $r$, and thence to the type wheel, to cause the letter on the wheel corresponding to that on the key lever to be turned into position. If it be desirable to have all the keys move the same distance, a lost motion can be allowed before the key-lever extensions $l^3$ come in contact with the bars $l^8$ or $l^9$.

The arm $r^7$ (Figs. 1, 15, and 16) carries triggers $r^9$ which triggers are nearly in form of bell-crank levers, having one arm extending at each side of bar $r^7$. The end $r^8$ of each of these triggers, in rear of bar $r^7$, engages an incline $r^{10}$, (Fig. 3) projecting from the frame, which swings the trigger on its pivot when that end of bar $r^7$ rises, thus withdrawing the trigger within the bar; but when the end of the bar carrying the trigger is depressed, the trigger remains projected and out of contact with the incline $r^{10}$. This arrangement of the triggers $r^9$ permits the bar $r^7$ to rock in either direction without throwing the non-operating trigger into engagement. Consequently bars $l^8$ or $l^9$ will not be raised by the depression of the bar at the other side of the machine. The triggers $r^9$ are held extended, save when pressed back by the inclines $r^{10}$, by means of springs $r^4$.

By the depression of any one of the keys $l'$ its lever $l$ is correspondingly depressed, the bar $l^8$ or $l^9$ is similarly actuated, the rock bar $r^7$ is moved by the engagement of the proper bar ($l^8$ or $l^9$) with its trigger, and the shaft $r$ is locked.

The shaft $r$ carries a segment gear $r^3$, which gear meshes with pinion $r^4$, on the shaft $r^6$, which shaft $r^6$ carries the type-wheel $r^5$. The shaft $r^6$ is journaled in the same frame as the shaft $r$, and turns in boxes $s$ and $s^4$. The segment gear $r^3$ is preferably much larger than the pinion $r^4$, so that a slight oscillation of rod $r$ will produce a much greater movement of the type wheel.

When the shaft $r$ has been rotated a sufficient distance to bring the letter represented by the key or button $l'$ on the key board to proper printing position, the key lever $l$, by projection $l^7$, (Fig. 5,) engages the bar $h^{15}$, which passes under all the key levers. This bar $h^{15}$ passes through a slot $l^{100}$ under the box $r'$, which box is made integral with the frame in which shaft $r$ is journaled. The power of the key, which was before exerted to rotate shaft $r$ through the mechanism described, is now diverted to the depression of the bar $h^{15}$, which carries the front end of shaft $r$ downward, rocking on trunnion $s^7$ thus raising the rear end of said bar and the type wheel $r^5$ supported on the frame of said shaft, and carrying the type wheel to printing position (Fig. 23). As the shaft $r$ moves on its trunnion with the same velocity as the key (under the pressure of bar $h^{15}$) it cannot rotate in its bearings at the same time, since there is no excess of movement to cause such rotation.

A spring $r^{12}$ (Figs. 5 and 33) holds the shaft $r$ from moving on its trunnion until it is pressed by the rod $h^{15}$, so that it is in proper position for rotation. A stop, $r^{13}$, on frame $s^2$ holds the front end of the shaft $r$ from rising beyond its proper position.

The key levers are all on a level on the top, but as the contact point $l^7$ of the key levers with the bar $h^{15}$ varies, it follows that the rotation of the shaft $r$ is of varying duration, according to the length of projections $l^3$ and $l^7$. The movement of bar $h^{15}$ to give the impression is equal in all cases.

For changing from small letters to capitals, the following mechanism is provided: The frame $s'$, $s^2$ in which shaft $r$ is journaled is hung in links $s^5$, (Figs. 1 and 33) which are rigidly attached to the rock shaft $s^6$, which shaft is journaled in suitable bearings in standards $s^8$. A bracket $s^3$ (Fig. 3) thrown out from frame $s'$, gives a double bearing for the frame on trunnion shaft $s^7$. This bracket $s^3$ extends beyond the type wheel $r^5$, and furnishes a support for the bearing $s^4$. The rock shaft $s^6$ (Fig. 5) has an arm $s^9$ keyed thereto. The end of arm $s^9$ away from shaft $s^6$ is attached to the rod $s^{10}$, which bears the button $s^{11}$ above the key-board. The depression of button $s^{11}$ rocks the shaft $s^6$, and through the rocking of links $s^5$ carries the type propelling shaft $r$ and its frame, and the type wheel, forward toward the front of the machine. The letters on the periphery of the type wheel are arranged side by side, first a capital and then a small letter. The rocking movement of the links $s^5$ is just sufficient to shift all the mechanism on trunnion $s^7$ including the type wheel far enough to place the capitals in the position otherwise occupied by the small letters. If only a single capital is to be printed, the finger is held on button $s^{11}$ until the proper key is struck. If it is desired to print with capitals for some time, the projection $s^{12}$ on the rod $s^{10}$ is made to catch under the casing $b$ by springing the upright a little to the front, the spring $s^{13}$ retaining the rod $s^{10}$ in this locked position.

To overcome the momentum of the type disk and its operating mechanism, so that the wheel shall not oscillate too far when a key is struck, a compensating apparatus is provided, as will be now described, (Figs. 4, 23, 24, and 25). The shaft $r$ has an arm $t$ firmly attached thereto. Two elongated loops $t^6$ and $t^7$ surround this arm. Loop $t^7$ is drawn to one side by spring $t^5$, attached to a bracket $t^2$ projecting from the frame $s'$ in which shaft $r$ is hung. The loop $t^6$ is pulled in the opposite direction by spring $t^4$ similarly attached to bracket $t^3$. Loop $t^6$ has a projection $t^{10}$ which engages a stop $t^8$ projecting from any suitable part of the frame. Loop $t^7$ has a similar projection $t^9$ engaging the other side of the same stop. Now suppose that the wheel driving shaft $r$ to be oscillated say in the direction of the arrows, Figs. 24 and 25, then the link $t^7$ will be drawn to the right, extending the spring $t^5$. The other link $t^6$ will remain at rest against the stop $t^8$ and the spring $t^5$ will tend to rock the shaft $r$ back. As soon as the pressure is removed from the letter key this spring $t^5$ returns the shaft $r$ to central position, but the loop $t^6$ and spring $t^4$ prevent it from going beyond that position. Thus the springs and loops form a compensating mechanism with a tendency to retain the rod $r$ in central position, or to return it to that position when it is oscillated.

The mechanism for "logotype" or word printing will now be described.

In all documents, especially of a legal character, there are certain words which frequently recur, as "that," "which," "and," &c. There are also many words with the same prefix, and many with the same suffix or terminal syllable. In this machine the word printing keys can be added to the regular key board mechanism, according to the character of the work to be performed. The same key may be made to print either the whole or a part of a compound word, omitting either the beginning or the ending. For instance take the word "therefore." A properly designed word key, as hereinafter described, can be made to print the whole word by a single depression. By a variation of the touch, so as to engage a part only of the key, the terminal only, "fore," will be printed, or by a reversal the word "there" only is produced. Many combinations may be made on this plan with a moderate number of word keys. The key levers $l$ have upper and lower bars, forming loops as clearly shown in Fig. 5, all the key levers being pivoted on the line of $l^2$. Each lever $l$ has a series of lugs $v$ extending inward from the side bars toward the middle of the loop. Each lug $v$ has a pivoted fly $v'$, held by its pivotal connection $v^2$ so that it will rock upward, but will take a firm bearing on lug $v$ and will not move down without carrying lug $v$ (and consequently lever $l$) with it. A series of shafts $v^3$ extend lengthwise of the machine, through all the loops of bars $l$. Each shaft $v^3$ carries a series of tappets $v^4$. The tappets $v^4$ are arranged on shaft $v^3$ on the principle of the pins on the cylinder of a music box. When shaft $v^3$ is rotated, its tappets are brought successively against the upper surfaces of the flies on levers $l$. Each engagement of a tappet with its fly depresses a lever $l$ far enough to print a letter. When any tappet has moved far enough to pass by its fly, the lever will be free to rise, and the next tappet may engage its fly and print the corresponding letter, and so on, the levers $l$ being depressed by the tappets and causing the printing operation to be performed in the same manner as if the keys $l'$ had been operated. The shafts $v^3$ have both a rotary and a longitudinal movement having bearings in frame $b$. (See Figs. 10 to 14.) On one end of each shaft $v^3$ there is a pinion $v^7$, splined to the shaft, so as to rotate therewith, but permitting the shaft to slide therethrough. This pinion $v^7$ is held from longitudinal movement by lugs $v^{20}$ extending from the frame or a projection $v^9$ thereon. A rack bar $v^{21}$, having a vertical sliding movement in the bearings $v^9$ (Fig. 11) engages the pinion $v^7$. A half disk or button $v^6$ on rack bar $v^{21}$ serves to depress the same. At the back of the rack bar $v^{21}$ there is a sliding bar $v^8$, which moves in boxes or bearings $v^9$, similarly to the rack bar $v^{21}$, but in rear of the same. The bar $v^8$ has an inclined slotted arm $v^{10}$ at one side, and connected thereto at top and bottom. The slot in the arm $v^{10}$ has alternately straight and inclined sides. The arm $v^{10}$ is in nowise connected to the rack bar $v^{21}$. At the upper end of bar $v^8$ the half button $v^5$ is supported on the swinging piece $v^{12}$, which piece $v^{12}$ is pivoted to the bar $v^8$ by pivot $v^{22}$. The half button or disk $v^5$ is pressed toward the half disk $v^6$ on rack bar $v^{21}$, by spring $v^{11}$, and a projection $v^{24}$ on half button $v^5$ is in position to engage the half button $v^6$, when the button $v^5$ is pressed down. Lug $v^{23}$ on bar $v^{21}$ prevents it from being pressed down except as it carries bar $v^8$ down with it, but bar $v^8$ has a certain amount of downward movement (limited by projection $v^{24}$) independently of the bar $v^{21}$. This downward movement of bar $v^8$ serves to shift the tappet shaft $v^3$ endwise, by means of the rolls $v^{16}$, mounted between collars $v^{14}$, on the square head $v^{15}$, which head $v^{15}$ is loosely held on shaft $v^3$ between said collars. The rolls $v^{16}$ run in the slots in bars $v^{10}$. The downward movement of bar $v^{21}$ serves to rotate the tappet shaft $v^3$. The downward movement of bar $v^3$ prior to the engagement of its projection $v^{24}$ with the half button $v^6$ shifts the tappet bar before the tappets are brought into action, thus omitting the first letter or syllable of a word. The lever $v^{18}$ pressed up by spring $v^{19}$ serves to return the sliding bars after they have been depressed.

Assuming the combination of the half buttons $v^5$ and $v^6$ to be such as to print the word "therefore," the mechanism can be made to operate as follows: Pushing down on half button $v^6$ carries down rack $v^{21}$, which engages pinion $v^7$ and rotates shaft $v^3$, which brings the tappets on said shaft successively into engagement with the flies $v'$ which actuate the key levers $l$, and so on to the printing mechanism hereinbefore described. As each tappet $v^4$ turns over, it releases the fly $v'$, and that lever resumes its normal position. As the downward motion of button $v^6$ is continued, the continuous rotation of the tappet shaft $v^3$ brings the other letters into operative position, and they are successively printed. After the first letter is printed the shaft $v^3$ receives a horizontal motion from the inclines in arm $v^{10}$, and this horizontal motion is controlled by the inclines $v^{10}$, to shift the bar endwise, or not, as circumstances require, so that the tappets are successively brought into working position. After the entire word is printed the release of the button permits all the parts to return to their normal position.

To omit the first part of the word, press down on the half button $v^5$. The half button $v^6$ and rack $v^{21}$ are not carried down until the projection $v^{24}$ engages said half button $v^6$, to lock the two half buttons together, but by the slot in arm $v^{10}$ the shaft $v^3$ is moved longitudinally, thus carrying the tappets which form the first part of the word out of position to engage their levers, so that the first part of the word will be omitted. To omit the last part of the word, place the finger on the half button $v^6$, and press the half button $v^5$ backward. By the yielding of the spring $v^{11}$ the half button $v^5$ is pressed back, until it is in range with a stop $v^{13}$ projecting from the frame. Now by pressing down on half button $v^6$, the rack $v^{21}$ actuates the tappet shaft until the half button $v^5$ is arrested by the stop $v^{13}$, when the downward movement of the rack will cease and the latter part of the word will not be printed.

It will readily be perceived that numerous combinations of words and syllables may be made. An expert operator, by noting the sound of the instrument, may be able to stop the depression of the key at such points as to omit other terminals than those provided for by the stops to the keys.

The inking ribbon is made to unwind itself from one drum or spool and wind upon another and reverse this movement automatically as soon as it shall have completed its travel by mechanism described in my application, Serial No. 441,530, filed July 28, 1892, as a division of this application.

The inking ribbon $x^{36}$ is supported on a plate $x^{35}$ (see Fig. 5), which plate $x^{35}$ has a slot in it permitting the type wheel $r^5$ to strike through the slot.

It will be understood that many of the figures of the illustration are diagrammatic, the frame and supports being intentionally omitted for convenience of illustration. It will also be understood that by throwing the roll escapement mechanism out of engagement, and locking the same, the paper feed movement may be effected in other ways, as for instance by the hand grasping the button $a^5$, and the printing may be effected as usual, the letters or figures being thus arranged in columns, at any desired distance apart, the indices on the machine distinctly indicating the position each letter and line will assume before it is printed.

It is evident that slight changes may be made from the form shown and described without departing from the spirit of the invention; also that the substitution of known equivalents as a weight for a spring, or one form of gear or lever for another is within the scope of the invention.

I do not herein claim the ribbon supporting and shifting mechanism of the type writing machine, as the same is shown, described and claimed in my application, Serial No. 441,530, filed July 28, 1892, as a division of this application.

I claim—

1. In a type writing machine, the paper carrying cylinder having a longitudinal groove in its face, the central shaft of said cylinder revoluble independently thereof, and the binding rod connected to said shaft at each end by elastic connections, substantially as described.

2. In a type writing machine, the combination of a paper holder, an actuating shaft therefor on which the holder is mounted, said shaft being constructed to slide in its bearings, and feeding mechanism engaged with and disengaged from said shaft by the sliding movement of the same.

3. The combination with the longitudinally grooved paper roll of a type writer, of parallel bars lying in said groove to secure the paper to the roll, as set forth.

4. The combination with the longitudinally grooved paper carrying roll of a type writer, of parallel bars to lie in said groove, and springs bearing said bars toward the roll.

5. The combination with the longitudinally grooved roll of a type writer, of a pair of spring pressed bars parallel with the axis of said roll, and a carrying frame connecting one of the rods with the shaft of the roll, substantially as described.

6. In a type writer, the carriage, a revolving paper carrying roll mounted thereon having a depression in its face, spring pressed rods adapted to lie in or to be lifted out of said depression, and movable cams in position to engage said rods, to lift them out of the depression, in combination, substantially as described.

7. In a type writer, the carriage and paper roll thereon having a depression in its face, a binding rod in position to lie in or be lifted out of said depression, and stops on the carriage movable into position to engage said rod in combination, substantially as described.

8. In a type writer, the combination with a paper carrying roll having a depression therein, of binding rods lying in said depression, and a series of cams at the ends of the roll acting on said rods, as set forth.

9. In a type writer, the combination with a revolving paper carrying roll having a depression therein, of two pivotal paper binding rods in said depression, one of said rods being hung to the roll so as to pass over the other.

10. In a type writer, the combination with a paper carrying roll, paper binding rods, cams for changing relation of said rods with said roll of movable stops for said cams.

11. In a type writer, the combination with a paper carrying roll, paper binding rods, cams for changing relation of said rods with said roll, of stops connected so as to act upon cams at the opposite ends of said roll.

12. In a type-writer, the combination of the paper roll, a mutilated gear mounted on the shaft to revolve synchronously with said roll, a power driven gear engaging with and tending to constantly rotate the paper roll, and a double toothed escapement wheel having side engagement with the mutilated gear, as described, said escapement wheel connected with the key mechanism to be intermittingly actuated thereby, substantially as described.

13. In a type writer, the combination with a paper carrying roll having rotary motion, a supporting carriage for said roll having constant tension on it, a wheel pivotally fastened to said carriage and engaging with a rack fastened to the frame of the type writer, of a train of mechanism substantially as described actuated intermittingly by said roll and adapted to rotate said wheel thereby permitting of rectilineal motion in said roll.

14. In a type writer, the combination with a paper carrying roll having rotary motion for spacing between letters and words, a carriage for supporting said roll a driving mechanism connected to said carriage, a spacing escapement composed essentially of an intermeshing wheel and rack, and mechanism substantially as described for actuating said wheel intermittingly of a pin adapted at a certain point of rotation of said roll to rotate the escapement wheel in said rack, thereby permitting the carriage to shift for the following line.

15. In a type writer having a paper carrying roll that revolves for spacing, a rod supporting said roll, a wheel of constant rotary tension on said rod, and an interlocking wheel having suitable rotating connection with the key board mechanism, all in combination substantially as stated.

16. In a type writer, the combination with a paper carrying carriage, an escapement wheel with a plurality of series of projections on its periphery said wheel connected to and having longitudinal movement with said carriage, of a stationary rack adapted to engage with said escapement wheel.

17. In a type writing machine, the combination with a paper carrying roll, a supporting carriage therefor, an abutment on said roll, an escapement wheel on said carriage engaging with a stationary rack, and a pawl and connections, whereby the stop on said roll transmits motion through said pawl to said escapement wheel.

18. In a type writer, the combination with a paper carrying roll having a controlling escapement consisting essentially of a rotating escapement wheel engaging with a stationary rack, a ratchet wheel and a pawl adapted to rotate said escapement wheel, of a lever for controlling the amount of the engagement of said pawl with the ratchet wheel.

19. The rack bar $e^3$ pivoted to the shaft $e^5$ on the frame and having teeth projecting toward the front of the machine, the escapement wheel $e'$ mounted on shaft $e$ of the carriage, and having its teeth in position to engage said rack bar, the lever $e^6$ pivoted to the carriage having a stud 60, and the bell crank lever pivoted to said stud, and having a pawl engaging a ratchet on the escapement wheel, and a spring engaging lever $e^6$ to hold it in any one of several positions, all combined substantially as described.

20. In a type writer, the combination with a paper carriage and mechanism substantially as described for giving rectilinear movement to said carriage, a stationary rack and rotating wheel interlocking with said rack, a pin with motion coincident with paper roll engaging with a bell crank carrying a pawl, of a lever carrying said bell crank and adapted to throw it beyond contact range with said pin.

21. In a type-writer, the carriage supported to have a movement lengthwise of the machine, a shaft extending lengthwise of the machine but journaled to rotate without moving with the carriage, a paper roll hung in the carriage and on the shaft so as to rotate with the shaft and reciprocate with the carriage as described, an escapement engaging the roll and actuated by the key mechanism, and an escapement engaging the carriage actuated by the rotation of the roll, and suitable adjunctive driving mechanism whereby the carriage is moved and paper roll rotated, all in combination substantially as described.

22. In a type-writer, the shaft extending lengthwise of the machine and the paper roll borne thereon and adapted for endwise movement, a shaft parallel with the paper-roll shaft and bearing an escapement wheel also adapted for endwise movement, a reciprocating carriage connected to the paper roll and the said escapement, a rack bar parallel with the escapement bearing shaft, a stud connected to and rotating with the paper roll shaft, and a lever in line of movement of the stud having a ratchet connection with the escapement, whereby the escapement is actuated to the extent of a single impulse with each revolution of the paper roll, the parts combined and relatively arranged, substantially as described.

23. The combination, in a type-writer, of a mechanism to rotate the paper roll for spacing between the letters and words, a mechanism to move the roll longitudinally for spacing between the lines, an escapement actuated by the paper roll to permit said longitudinal movement, and an adjustable connection between the roll and the escapement whereby the extent of movement of the escapement (and consequently the distance between lines) is determined, the parts being constructed, combined, and relatively arranged substantially as set forth.

24. In a type-writer, the combination of a longitudinally reciprocating paper roll, a double-toothed escapement wheel partaking of the longitudinal movement of the paper roll, and actuated a single impulse with each rotation of the roll by intermediate mechanism substantially as described, and a rack with which the teeth of said escapement wheel have engagement, substantially as set forth.

25. In a type writer, the combination with the paper roll, and a shaft to transmit rotary motion thereto, of a wheel under constant tension for the rotation of said shaft, and a clutch having a single point of engagement by which the wheel and shaft may be engaged, whereby on disengaging the roll from the escapement re-engagement can be had only in the same position substantially as described.

26. In a type writer, the combination of a paper roll, an escapement gear wheel having operative connection to said roll, and an escapement gear having a double set of teeth intermeshing with said first mentioned gear, substantially as described.

27. In a type writer, the combination with a revolving paper roll, a shaft forming the axis thereof, a wheel locked to said shaft and mechanism whereby rotating tension is transmitted to said wheel, of an interlocking wheel whereby the former wheel by the intermittent rotation of the latter has impulses imparted to it by its tension power.

28. The letter and word spacing device, consisting essentially of two interlocking wheels, adjunctive connections from one of the wheels to the paper roll, a spring pressed pawl engaging one of the wheels, and lever connections from the keys operating said pawl, all combined substantially as described.

29. In a type writer, the combination with the roll-actuating mechanism, of an escapement consisting essentially of two intermeshing wheels, one of said wheels being detachable from the other, and a lifting piece by which the movable wheel may be thrown out of engagement with the other wheel, substantially as described.

30. In a type writer, the combination with the paper roll and mechanism substantially as described for rotating the same, of an escapement consisting essentially of two interlocking wheels, and a clutch connecting one of said wheels with its shaft.

31. The clutch gears engaging each other, one of said gears being under spring pressure to produce a forward movement of the paper roll, means substantially as described for disengaging said gears (to permit a movement of the paper roll independent of the escapement), and a stop with which one member of said clutch gear engages when the gears are not in engagement, the parts combined substantially as described.

32. In a type writer, an escapement controlling the spacing device consisting essentially of two interlocking wheels, a sliding clutch for releasing rotating tension thereon, lever mechanism for operating said clutch, and an arm adapted to disengage the two interlocking wheels at proper intervals of time, all in combination, substantially as described.

33. In a type writer having a letter and word spacing device consisting essentially of two interlocking escapement wheels, one of said wheels having constant rotating tension acting on it, an arm to disengage the two, and a stop on the tension wheel adapted to engage with a lug on said arm when the two are disengaged thereby automatically stopping the paper roll at a predetermined proper point for commencement of sentence or address all in combination substantially as described.

34. In a type writer having a letter and word spacing device, an escapement wheel with constant rotating tension acting thereon, a wheel interlocking therewith, an arm for disengaging said wheels, and a brake surface upon the tension wheel adapted to register with a brake on said arm simultaneously with their disengagement and thereby control rapidity of rotation, all combined substantially as described.

35. The combination with the spring rotated paper roll, of the escapement consisting essentially of two interlocking wheels, mechanism substantially as described for disengaging said wheels, a stop, and mechanism substantially as described leading back to the keyboard by which said stop is controlled.

36. The paper roll, an escapement controlling the movement thereof, means for disengaging said escapement, and an operating key and connections therefrom to the roll, whereby the escapement may be disengaged and the movement of the roll reversed by manipulating the key, all in combination substantially as described.

37. In a type writer, the combination of an escapement gear wheel under constant tension, a double gear wheel at right angles to the same and having a set of teeth, a space, and a second set of teeth opposite the interdental spaces of the first set, and a pawl actuating said double wheel in such manner as to permit an intermitting movement of the first wheel, substantially as described.

38. In a type writer having letter and word spacing device consisting essentially of two interlocking wheels, pawls to reverse the motion of said wheels, and cams and connections for actuating said pawls, all combined substantially as stated.

39. In a type writer having letter and word spacing device, consisting essentially of two interlocking wheels, pawls for reversing their motion, cams for gaging movement of pawls, and a key and intermediate connecting mechanism for operating said cams, all in combination substantially as stated.

40. In a type writer, the combination of a paper carriage, and a winding drum, of a flexible connection between said carriage and drum, and a driving spring having yielding connection to said drum.

41. In a type writing machine, a spring acting on the winding drum to move the carriage, and a second spring acting on the paper roll to rotate the same, and a pawl connection between the winding drum and the roller moving spring, whereby both springs will be wound together but may unwind independently, the parts in combination substantially as described.

42. In a type writer having a line spacing device and a letter spacing device, the combination of two springs, and intermediate connecting mechanism with a device whereby the springs in unwinding act independently of each other.

43. In a type-writer, a type disk on a shaft supported in a pivoted frame, a gear on said shaft and a gear at an angle thereto by which the type disk is rotated, and a key-lever connected to said frame by which the frame may be shifted to carry the type disk sidewise, the parts being constructed, combined and relatively arranged, substantially as described.

44. A type disk having printing characters on its periphery, a bevel gear on the shaft of said disk, a swinging frame supporting the shaft, a driving shaft at an angle to the disk shaft having a bevel gear engaging the gear on the disk shaft, actuating mechanism connected with the keys for turning said driving shaft, a key mechanism for shifting the position of the frame, and a spring for retracting said frame, the parts being combined, constructed, and relatively arranged substantially as described.

45. In a type writer, the combination with a paper roll having a longitudinal groove in its surface, of a binding rod or bar in said groove, said rod having its outer surface conforming to the contour of the roll, and springs connecting the ends of said rod to the roll, substantially as described.

46. In a type writer, the combination with an oscillating type disk mounted on a shaft, of a rock shaft connected to said disk, arms or triggers connected to said rock shaft, and a separate bar at each side of the machine in position to engage the proper trigger and rock the shaft and type disk, substantially as described.

47. In a type writer, the combination with an oscillating type disk, its shaft and an arm for receiving motion from suitable levers, and intermediate connecting mechanism of a pivotal trigger on said arm, with which said mechanism engages.

48. In a type writer, the combination with an oscillating type disk an arm for receiving motion from suitable levers a pivoted trigger on said arm of a stationary cam adapted to turn said trigger on its pivot.

49. In a type writer, the combination with a shaft capable of partial rotation transmitting motion to a type disk registering with a paper carrying roll, of a pivotal supporting frame, and an arm and suitable key for changing the relative lateral position of said roll and type disk.

50. In a type-writer, a printing disk having letters on its periphery, a series of levers and connecting mechanism substantially as described for actuating said disk, a longitudinally shifting rod having tappets in position to engage several of said levers when rotated, and mechanism to shift and to rotate said rod, the parts being constructed, combined, and relatively arranged, substantially as described.

51. The rotating type disk having letters on its periphery, the key board mechanism and connections substantially as described for actuating said disk, and a shifting rod having tappets in position to engage a series of the connections from the key board, and actuate the same successively, all the parts being constructed, combined and relatively arranged substantially as described.

52. In combination with a type disk, a series of levers for actuating said disk, and a key mechanism for shifting the position of the disk, all substantially as described, a shifting rod having tappets in position to engage a number of the key levers successively, substantially as set forth.

53. The combination with the type-disk, and lever mechanism substantially as described for actuating the same, of a series of lugs on the levers, each having a pivoted fly, and a shifting rod having tappets thereon, the tappets adapted to engage the pivoted flies, and actuate the levers when the shaft is rotated in one direction, substantially as set forth.

54. In a type writer, the combination with a system of printing characters and key mechanisms whereby said characters may be manipulated individually, of a second key mechanism connected to the printing characters, and operating a plurality of said characters, substantially as described.

55. In a type writer, a series of letter printing characters and key mechanism for manipulating the same singly, a second key mechanism acting on a plurality of said characters to produce syllables, and a stop for limiting the movement of said second key, in combination, substantially as described.

56. In a type writer, a series of printing characters and separate mechanisms for actuating the same singly, a second key mechanism acting on a plurality of printing characters to operate the same by a single movement of the key, and a lost motion connection to said second key, whereby a part of its movement may be inoperative, all in combination.

57. In a type writer, the combination with a series of type controlling levers and a rotating rod, of tappets on said rod adapted to engage any one or several of said levers upon rotation of said rod.

58. In a type writer, the combination with a series of type controlling levers, and a rod adapted to impart motion to any one or several of said levers, a pinion on said rod, of a rack adapted to engage with said pinion and rotate said rod.

59. In a type writer, the combination with a series of type controlling levers, a rod and suitable intervening connections adapted to impart motion to any one or several of said levers, of a cam for giving lateral motion to said rod.

60. In a type writer, the combination with a rod for operating any one or several of the type controlling levers, a rack and pinion for imparting rotary motion to the rod, a cam for giving longitudinal motion to said rod, of a key having said cam attached thereto and having limited motion in relation to the rotating rod.

61. In a type writer, the combination with a revolving and laterally movable rod for operating any one or several of the type controlling levers, a key for imparting said motion of an adjustable portion of said key adapted to engage with a rigid stop and thereby limit motion of the key, $v^5$.

62. In a type writer, a revolving and laterally movable rod for operating any one or several of the type controlling levers, of a double key one portion controlling the rotation of said rod, the other the lateral motion.

63. In a type writer, the combination with a series of type controlling levers, of a rod and suitable intervening connecting mechanism for operating any one or several of said levers, a key for operating the rod, and a spring to return said key to normal position after displacement.

64. In a type writer, the combination with a series of type controlling levers, of a series of movable rods and suitable connecting mechanism, each rod adapted to operate a series of said levers and thereby perform the proper function required to print a series of predetermined characters.

In testimony whereof I affix my signature in presence of two witnesses.

WILLIS J. PERKINS.

Witnesses:
G. MARRETSON,
FRANK P. CARPENTER.